United States Patent [19]

Cassou

[11] Patent Number: 4,712,200
[45] Date of Patent: Dec. 8, 1987

[54] DEVICE FOR PROCESSING MODULATED SIGNALS RECEIVED BY A LATERAL SONAR SYSTEM

[75] Inventor: Jean-Pierre Cassou, Paris, France

[73] Assignee: Institut Francais du Petrole, Rueil-Malmaison, France

[21] Appl. No.: 720,793

[22] Filed: Apr. 8, 1985

[30] Foreign Application Priority Data

Apr. 6, 1984 [FR] France ................... 84 05616

[51] Int. Cl.⁴ .................... G01S 9/66; G01S 9/68
[52] U.S. Cl. ......................... 367/88; 367/97; 367/106; 367/904
[58] Field of Search ............ 367/88, 97, 106, 904; 342/191, 25, 194

[56] References Cited

U.S. PATENT DOCUMENTS

| | | | |
|---|---|---|---|
| 3,484,737 | 12/1969 | Walsh | 367/88 |
| 4,034,370 | 7/1977 | Mims | 367/12 |
| 4,069,468 | 1/1978 | Bartram | 367/97 |
| 4,088,978 | 5/1978 | Gilmour | 367/88 |
| 4,095,224 | 6/1978 | Dounce et al. | 342/194 |
| 4,232,380 | 11/1980 | Caron et al. | 367/88 |
| 4,262,344 | 4/1981 | Gilmour | 367/88 |
| 4,403,311 | 9/1983 | Tournois | 367/88 |

Primary Examiner—Thomas H. Tarcza
Assistant Examiner—Daniel T. Pihulic
Attorney, Agent, or Firm—Antonelli, Terry & Wands

[57] ABSTRACT

A device for processing echoes back scattered from the surface of the sea bed in response to sound pulses transmitted by a fish towed while immersed, comprising at least one assembly for determining the components $X_C$ and $X_S$ of the complex envelope of the signals received by a reception chain or from a part thereof, obtained by selective filtering of a narrow band in the frequency spectrum, and computing, storage and display means for obtaining a representation of the variations in time of the complex amplitude of the signals received.

8 Claims, 8 Drawing Figures

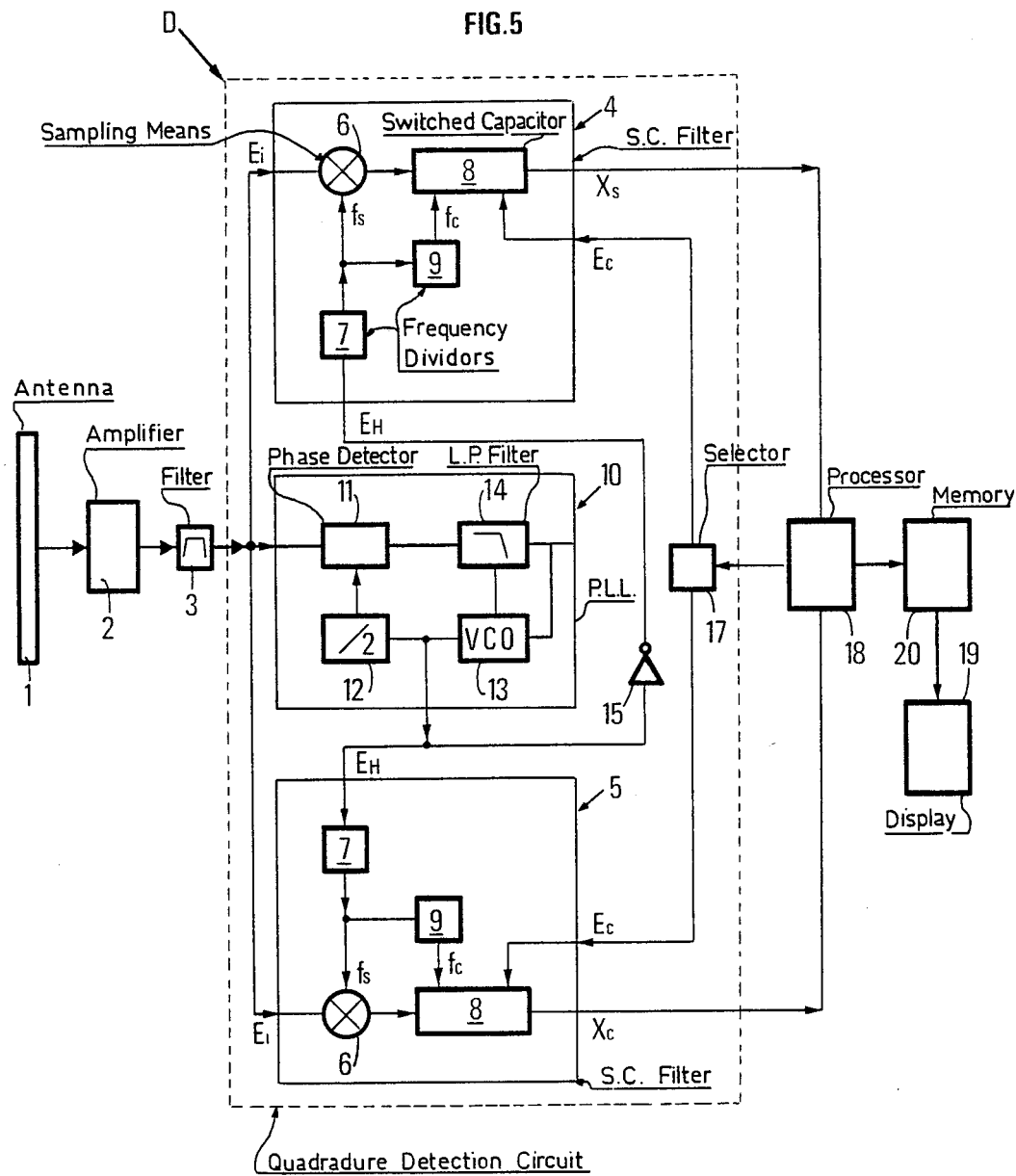

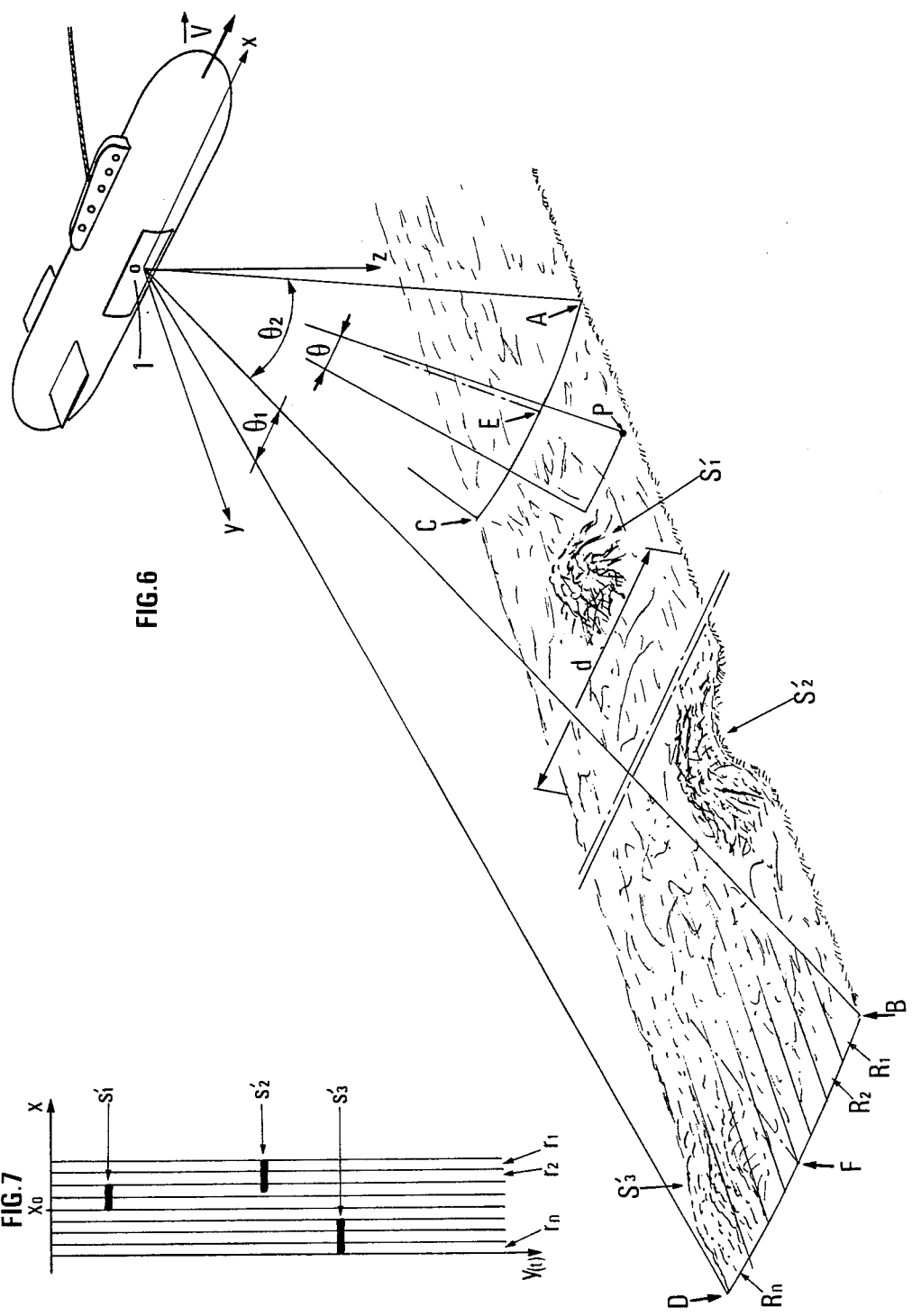

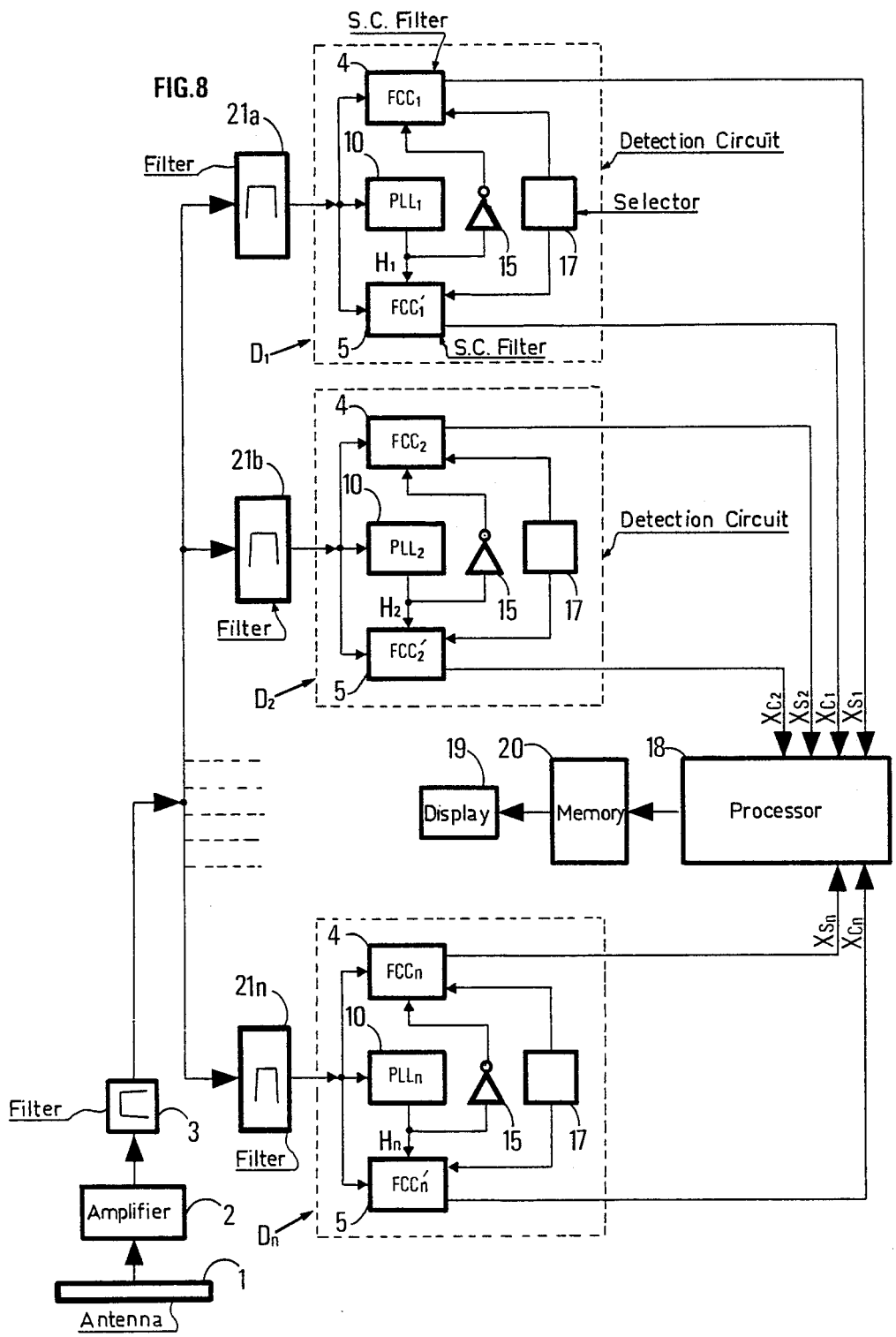

4,712,200

DEVICE FOR PROCESSING MODULATED SIGNALS RECEIVED BY A LATERAL SONAR SYSTEM

BACKGROUND OF THE INVENTION

1. Field of the Invention

The invention relates to a device for processing the modulated signals received by a sonar system and more particularly a side-looking sonar system;

2. Description of the Prior Art

Side-looking sonar systems generally comprise one or more transmitting and receiving transducers fixed to the hull of a ship or a profiled body called a fish, which is towed in an immersed state by the ship. Each of these transducers comprises a plurality of transducers aligned in a direction parallel to the longitudinal axis of the ship or fish, so that its directional pattern has a very small opening angle on each side of a vertical transverse plane and a wider opening angle in the same plane. The transmitting transducers are energized at regular intervals for sending sound pulses in an oblique direction to the bottom of the water. These pulses irradiate or "insonifies" the bottom on one side or on both sides of the ship or fish along a narrow band elongated perpendicularly to the ship route and are backscattered to the surface.

The receiving transducer or the receiving transducers, because of their directional pattern, are adapted for picking up preferably the echoes coming from the irradiated bands.

The signals received by the transducers, in response to the transmitted pulses, are amplified preferably with an amplification gain increasing with time, so as to correct the amplitude variations due to the obliqueness of the propagation paths, and then are detected so as to obtain a low frequency signal representative of the envelope of these signals.

Then the demodulated signals are recorded as a function of the propagation time so as to obtain transverse sweeping of the irradiated zone. The demodulated signals are used for example for varying as a function of time the intensity of the spot of an optical recorder or of a cathode ray tube. The transmission-reception cycles are repeated regularly as the ship advances and the successive records are juxtaposed so as to obtain a relatively continuous image of the bottom. A lateral sonar is described for example in French Pat. No. 2 064 4400.

Detection or recovery of the envelope of the signals received is very often obtained in sonar systems by rectifying said signals and the information which they contain relative to the phase variations is in general not used.

The signals received are affected, with respect to the transmitted signals, by rapidly varying phase shifts characteristic of the modifications of the diffraction or back scattering power of the irradiated surface and slow varying phase shifts due to the Doppler effect and resulting from the relative speed, with respect to the moving ship, of the portions of this surface situated outside the transverse plane of symmetry of the transmitter beams. The non-use of the phase data means that no distinction can be made on the image between the unevennesses of the bottom situated in the plane of symmetry of the beam and outside this plane.

The processing device of the invention is adapted to take into account the phase variations of the back scattered signals and consequently allows a finer representation of the bottom surface.

SUMMARY OF THE INVENTION

The processing device of the invention thus comprises filtering means for selecting at least one frequency band in the frequency spectrum of the received signals, at least one demodulating assembly formed by a phase locked circuit for generating a reference signal whose frequency depends on at least one of the signals received and combination means for generating, from this part of said received signals and from said reference signal from the phase locked circuit, signals corresponding to the quadrature components of the complex amplitude; it also comprises a processor for processing the signals from the combination means, this processor being adapted for calculating the complex amplitude from its components, and means for representing the variation of the complex amplitude, as a function of time, at each transmission-reception cycle.

Storage means may be used for storing the values taken successively during each cycle for each complex amplitude, these storage means being inserted between the processor and the representation means.

The device may advantageously comprise a plurality of band-pass filters adapted for subdividing the signals received into a plurality of filtered signals whose frequency spectra are complementary and a plurality of demodulation assemblies connected respectively to the outputs of the filters. The processor is adapted for calculating the complex amplitudes of the different filtered and demodulated signals and the representation means are supplied successively with the different signals corresponding to the different complex amplitudes, so as to juxtapose the plots representative respectively of said complex amplitudes. Thus, dissocation of the echoes depending on their transverse position in the "insonified" surface may be obtained, which leads to a finer representation of this surface.

BRIEF DESCRIPTION OF THE DRAWINGS

Other features and advantages of the device will be clear from the following description of preferred but in no wise limitative embodiments of the invention, illustrated by the accompanying drawings in which:

FIG. 5 shows the block diagram of a first embodiment of the processing device;

FIG. 6 shows very schematically the solid transmission-reception angle of the sound energy and the area covered during each cycle by the sound waves, in the case where said surface is divided into a plurality of adjacent elementary strips perpendicular to the path followed by the fish, whose respective energy contribution to the sound energy of the received signals are obtained by spectral chopping of said signals by means of narrow band pass filters;

FIG. 7 shows in a very simplified fashion the recording plot resulting from the juxtaposition of elementary plots corresponding to the different signals obtained by spectral chopping; and FIG. 8 schematically shows a second embodiment of the device in which the signals received and filtered by different band pass filters are processed separately.

DESCRIPTION OF THE PREFERRED EMBODIMENTS

Figure 4:
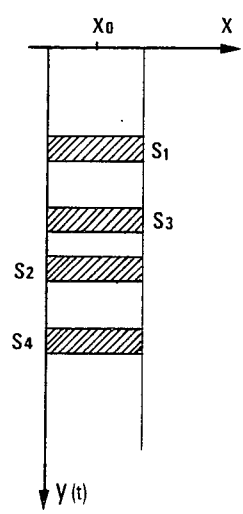
FIG. 4 shows in a very simplified fashion a plot of the recording corresponding to the "insonified" surface shown in FIG. 11.
Figure 1:
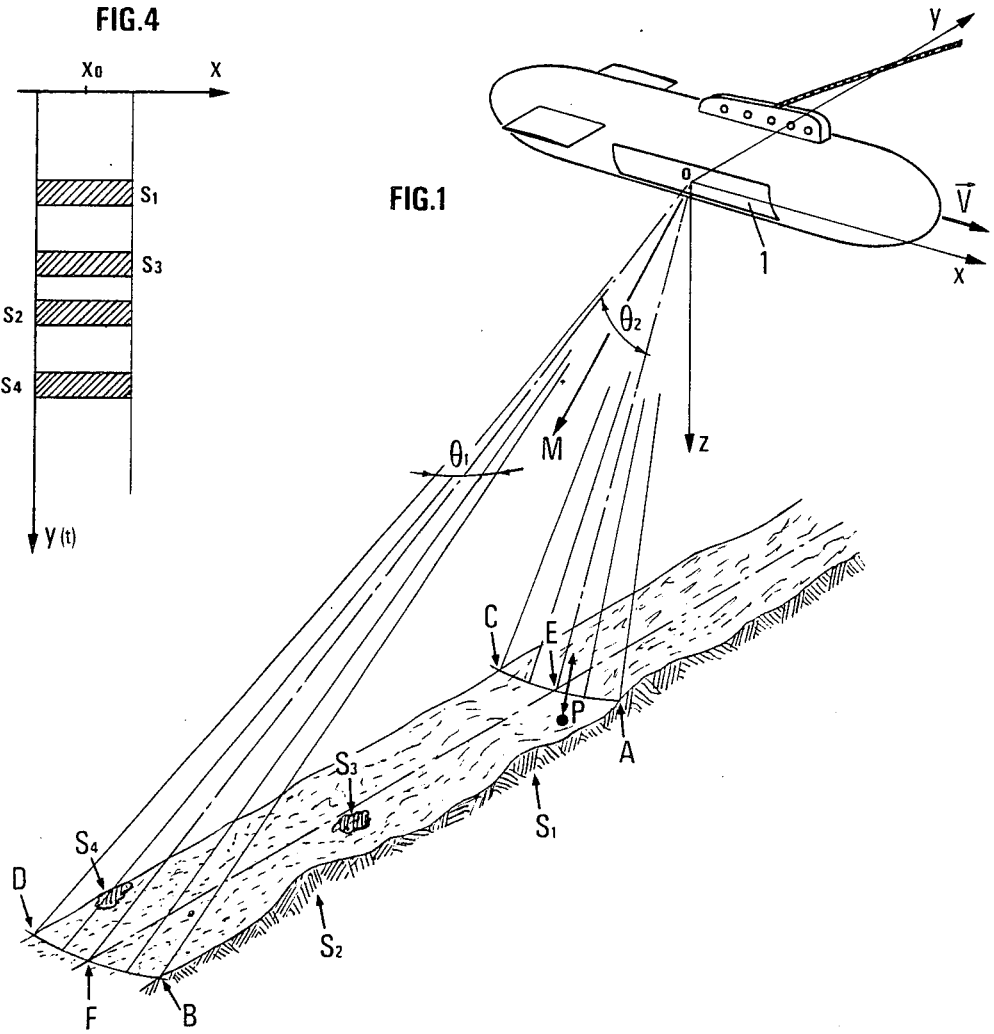
FIG. 1 shows very schematically the solid angle in which is propagated the largest part of the sound energy emitted by the antenna of a side looking and of the sound energy back scattered from the bottom of the water and picked up by said antenna.

The fish shown in FIG. 1 comprises at least one transmitting-receiving transducer array 1 of a known type fixed to a lateral part of the hull. This transducer array is formed from an assembly of aligned transducers whose direction of alignment is substantially parallel to the longitudinal axis ox of the ship. Its main axis OM is orientated in an oblique direction in the transverse plane yoz.

Such a transducer array has a directivity pattern whose main lobe is very narrow on each side of the vertical plane yoz containing the main transmission axis OM and fairly open in this same plane. The values of the angles at the apex $\theta_1$, $\theta_2$ of the beam respectively in the longitudinal plane and in a transverse plane are for example of the order of 1° to 5° and from 30° to 60°, so that the area of the bottom irradiated or "insonified" by each sound pulse transmitted is a fairly narrow transverse strip.

Another identical transducer array may be disposed symmetrically to the first one with respect to the vertical so as to irradiate two identical areas on each side of the fish.

Figure 2:
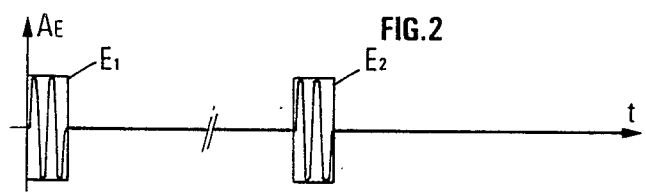
FIG. 2 is a timing diagram of the transmitted pulses.
Figure 3:
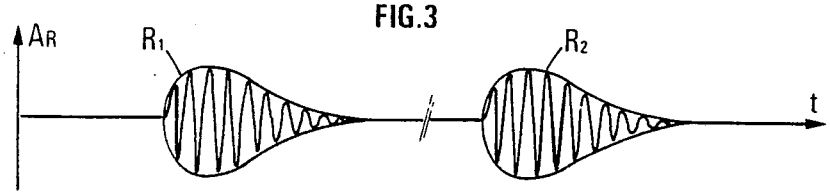
FIG. 3 schematically shows a timing diagram of the back scattered pulses in response to the transmitted pulses.

Each echo $R_1 \ldots R_k$ (FIG. 3) corresponding to the sound energy back scattered or diffracted by the unevenesses of the ground strip irradiated by a previously transmitted (FIG. 2) sound pulse $E_1 \ldots E_k$ is received by the receiving transducer array and the signals generated by the transducers are applied to a reception system shown in FIG. 5.

This system comprises a variable gain amplifier 2 of known type, whose gain increases from the beginning of the reception of each echo, so as to compensate for the propagation time of the sound waves. The amplifier 2 is connected to a selective filter 3 centered on the frequency of the sound signals transmitted. The signal at the output of filter 3 is connected to the input of an envelope detection device which comprises two switched capacitor filters 4, 5 of known type manufactured for example by the firm RETICON under the reference R5620, whose inputs $E_i$ are connected to the output filter 3. Each of these assemblies comprises a sampling means 6 adapted to take from the signal applied to it input $E_1$ a succession of samples at the command of a sampling signal whose frequency fs is preferably chosen substantially equal to the central frequency of the echoes received.

The sampling signal is provided by a first frequency divider element 7 adapted for dividing by two the frequency of a clock signal applied to its input $E_H$. The sequence of samples from the sampling means 6 is transferred to a switched capacitor filter 8 to which a switching signal is applied of frequency fc which is provided by a second dividing element 9 which divides by a factor k, equal to 50 for example, the frequency of the signal from the first dividing element 7, this switched capacitor filter acting as a low pass filter.

The signal from the band pass filter 3 is also applied to the input of a phase locked loop 10 comprising a phase detector 11 adapted for generating a signal depending on the phase shift between the signal at the input and a signal generated by a dividing element 12. This latter divides by two the frequency of a signal from a voltage controlled oscillator (VCO) 13. The control voltage of oscillator 13 is that from a low pass filter 14 whose input is connected to the output of the phase detector 11. A division by two being provided in the phase loop, the frequency of the signal from oscillator 13 is double the preponderant frequency of the frequency spectrum of the signals from low pass filter 3.

The signal generated by oscillator 13 is used as a clock signal for the filtering assemblies 4, 5. It is applied directly to the input $E_H$ of the filtering assembly 5 and, through a inverter 15, to the input $E_H$ of the filtering assembly 4. The sampling signals from the divider elements 7 of the two filtering assemblies 4, 5 are consequently phase shifted by $\pi/2$ with respect to each other, which allows quadrature detection to be obtained of the components of the complex envelope of the applied sonar signals.

The transfer function of the switched capacitor filters 8 and the filtering parameters are chosen by applying to the control input $E_c$ of the two filtering assemblies 4, 5 the signals from a selector element 17.

The quadrature signals $X_S, X_C$ available at the outputs of the filtering assemblies 4, 5 and whose frequency spectra are centered on the zero frequency, are applied to a processor 18 adapted in particular for combining the voltages $X_C$ and $X_S$ so as to obtain the complex amplitude $$A = \sqrt{X_C^2 + X_S^2} . \qquad (1)$$

The voltage resulting from this combination is applied to a display element 19 formed for example by an optical recorder or a cathode ray tube and serves for modulating the intensity of its light spot.

A memory 20 may be used for storing the data delivered by processor 18. Thus a representation is obtained, as a function of time, of all of the points of the lateral area irradiated from the closest to the furthest away, each zone providing its own contribution to the phase variations of the signals received. It can be seen, on the simplified representation of the recording plot corresponding to a transverse strip irradiated by the sonar, situated at any abscissa $x_o$, that the uneveness of the relief at $S_1, S_2, S_3, S_4$ of this area results in transverse lines $S_1, S_2, S_3, S_4$ spread out over the whole width of the corresponding displayed plot. At each reception time, that is to say for the same ordinate y(t), a preponderent echo is chosen in the frequency band of the signals received and no distinction can be made at the same time between two distinct echoes in the same frequency band which are affected by different Doppler frequency shifts.

One embodiment of the device capable of dissociating several echos in the demodulated signals received together at any time and consequently capable of increasing the fineness of recovery of the details of the "insonified" terrain, will be described hereafter.

The principle on which this embodiment is based takes into account the more or less large shift affecting, because of the Doppler effect, the frequency of the sound waves back scattered by the different portions of the irradiated surface strip.

The frequency difference affecting the signals transmitted and received in any direction OP of the solid transmission-reception angle OABCD (FIG. 1 or 6) is, as known, proportional to the projection $V \sin \theta$ of the speed vector $\vec{V}$ of the fish in the direction OP and is all the greater the further this latter is away from the median vertical plane.

If f is the frequency of the sound pulse signals transmitted, the frequency of the waves received will vary from $f+\Delta f$ for those which come from the edge AB in front of the transverse vertical plane yoz of the irradiated surface strip of $f-\Delta f$ for those which come from the edge CD symmetrical with AB with respect to the vertical plane, the frequency difference being cancelled out for the sound waves coming from the median line EF. If the frequency interval of width $\Delta F = 2\Delta f$, centered on the central frequency f, is chopped into n equal intervals $\Delta f_1, \Delta f_2, \ldots \Delta f_n$, the sound waves received in these frequency intervals will correspond respectively to contributions of n adjacent elementary strips $R_1, R_2, \ldots R_n$ of the irradiated surface ABCD, parallel to the axis oy and of width d/n. Consequently, the separate use of the signals belonging to all these frequency intervals and juxtaposition thereof on a common display means will allow a representation to be obtained at the same time of multiple echoes by suppressing the effect of selection of the strongest echo which occurs when all the frequency spectrum of width $\Delta F$ of the signal received is used as a whole at any time. The power of resolution of the sonar is thus very substantially improved. The very simplified and schematical example of recording y(t) shown in FIG. 7 and which is formed from the juxtaposition of plots $r_1, r_2 \ldots r_n$ corresponding to the respective contributions of the elementary strips $R_1, R_2 \ldots R_n$ of the irradiated ground strip ABCD, the fish being located at the abscissa $x_o$, shows that the positions $s'_1, s'_2, s'_3$ of the surface unevenesses $S'_1, S'_2, S'_3$ (FIG. 6) may be localized at their exact position within the display plot corresponding to the surface ABCD.

The embodiment shown in FIG. 8 which applies this frequency chopping principle also comprises a selection and amplification assembly formed by a variable gain amplifier 2 for amplifying the signal received by each receiving antenna 1, and a band pass filter 3. But in this embodiment, the output of filter 3 is connected in parallel to n quadrature detection circuits ($D_1, D_2 \ldots D_n$) similar to circuit D shown in FIG. 5, through n selective filters 21a, 21b ... 21n, whose pass bands are equal and complementary. If F is the length of the pass band of the filter 3, that of each of the filters 21a to 21n is equal to $\Delta F/n$.

Each detection circuit $D_1, D_2 \ldots D_n$ comprises two filtering assemblies 4 and 5 whose filtering parameters and transfer functions are adjusted by means of a selector element 17, these two assemblies being supplied at their clock inputs with two phase opposition signals coming from the output of the internal oscillator of a phase locked loop circuit of the quartz PLL type and adapted for oscillating at a freuency double the central frequency of the filter (21a, 21b ... 21n) from which it receives the signals.

The pairs of quadrature signals ($X_{S1}, X_{C1}$), ($X_{S2}, X_{C2}$) ... ($X_{Sn}, X_{Cn}$) generated respectively by circuits $D_1, D_2$. .. $D_n$ are applied to a processor 18 which determines by applying relationship (1), the complex amplitudes $A_1, A_2 \ldots A_n$ corresponding to the quadrature signal pairs.

The resulting signals corresponding to these different complex amplitudes are transferred to a memory 20. All the complex amplitude values relative to the same transmission-reception cycle are then read out from the memory and used for modulating for example the spot of an optical recorder or a cathode ray tube 19, in a sequence such that on the screen thereof there are juxtaposed n elementary plots corresponding respectively to the n complementary frequency bands defined by the filters 21a to 21n and, as was seen, to n adjacent narrow strips of the "insonified" surface at all times.

If the space through which the fish travels in the time interval separating two successive transmission-reception cycles is less than the width of the irradiating beam at the bottom, the strips of ground irradiated during two successive cycles will be partially superimposed. The same ground uneveness back scattering the sound energy during several successive cycles, creates several successive echoes which are detected respectively in several different spectral bands because its position in the irradiated strip and consequently its slant with respect to the transverse vertical plane yoz change from one cycle to another. The same echo is thus detected successively on different plots of the set $r_1, r_2 \ldots r_n$.

Because of the partial overlapping of the displayed strips, which means that the same echo is detectable on several separate plots, the processor 18 may be adapted for combining signals corresponding to identical echo signals so as to minimize uncertain echoes.

I claim:

1. A device for processing amplitude and phase modulated signals received at each transmission-reception cycle by a side-looking sonar system, these signals being the echoes backscattered by the surface at the bottom of a mass of water of sound pulses transmitted from a vehicle carrying said sonar system, comprising: filtering means connected to receive said amplitude and phase modulated signals for selecting at least one frequency band in the frequency spectrum of the signals received; demodulation assembly means, including local oscillator means, for producing a reference signal and combination means for generating, from said received filtered signals and from the reference signal, signals corresponding to the quadrature components of the complex amplitude of the received signals; processor means for calculating said complex amplitude from its quadrature components; and display means for representing the variations of said complex amplitude, as a function of time, at each transmission-reception cycle; wherein said local oscillator means is included in a phase locked loop circuit connected to said filtering means whereby the frequency of said reference signal depends on that of the filtered signals irrespective of any Doppler shift affecting received signals.

2. The device as claimed in claim 1, further comprising memory means for storing the values taken during each cycle by each complex amplitude, said memory means being connected between said processor means and said representation means.

3. The device as claimed in claim 1, wherein said display means comprises an optical sweep recorder, the intensity of the recording light beam being modulated by the signals representing the variations as a function of time of each complex amplitude.

4. A device for processing amplitude and phase modulated signals received at each transmission-reception cycle by a side-looking sonar system, these signals being the echoes backscattered by the surface at the bottom of a mass of water of sound pulses transmitted from a vehicle carrying said sonar system, comprising: filter means connected to receive said amplitude and phase modulated signals for selecting at least one frequency band in the frequency spectrum of the signal received; demodulation assembly means, including local oscillator means, for producing a reference signal and combination means for generating, from said received filtered signals and from the reference signal, signals corresponding to the quadrature components of the complex amplitude of the received signals; processor means for calculating said complex amplitude from its quadrature components; and display means for representing the variations of said complex amplitude, as a function of time, at each transmission-reception cycle; wherein said demodulation assembly means comprises two switched capacitor filtering circuits each comprising a sequential sampling means and a switched capacitor filter whose sampling and switching frequencies depend on the frequency of a clock signal, the clock signals applied to said two filtering assemblies being respectively said reference signal and this same reference signal phase shifted by a logic inverter, and wherein said local oscillator means is included in a phase locked loop circuit connected to said filtering means whereby the frequency of said reference signal depends on that of the filtered signals irrespective of any Doppler shift affecting received signals.

5. The device as claimed in claim 4, wherein said local oscillator means in a voltage controlled oscillator connected with a frequency dividing element to oscillate at a frequency double the central frequency of the received filtered signals applied to said local oscillator means, the signal from said local oscillator means forming said reference signal.

6. A device for processing amplitude and phase modulated signals received at each transmission-reception cycle by a side-looking sonar system, these signals being the echoes backscattered by the surface at the bottom of a mass of water of sound pulses transmitted from a vehicle carrying said sonar system, said device comprising: filtering means connected to receive said amplitude and phase modulated signals; demodulation assembly means, including a local oscillator means, for producing a reference signal whose frequency depends on a frequency band selected by said filtering means and combination means for generating, from the received filtered signals and from the reference signal, signals corresponding to the quadrature components of the complex amplitude of the received signals; processor means for calculating said complex amplitude from its quadrature components; and display means for representing the variations of said complex amplitude, as a function of time, at each transmission-reception cycle; wherein said filtering means comprises a plurality of selective filters for subdividing the signals received into a plurality of filtered signals whose frequency spectra are complementary, and said demodulation assembly means comprises a plurality of demodulation assemblies connected respectively to the outputs of the selective filters, said processor means being adapted for calculating the complex amplitudes of the different filtered signals and said display means being supplied successively with the different signals corresponding to the different complex amplitudes so as to juxtapose the plots representative respectively of said complex amplitudes.

7. The device as claimed in claim 6, wherein said display means comprises an optical sweep recorder, the intensity of the recording light beam being modulated by the signals representing the variations as a function of time of each complex amplitude.

8. The device as claimed in claim 7, and further comprising a memory for storing the values taken at each instant by the different complex amplitudes determined by the processor means and means for reading out from the memory successively the assembly of the signals representing the variations as a function of time of each complex amplitude.

* * * * *